US008345025B2

(12) United States Patent
Seibert et al.

(10) Patent No.: US 8,345,025 B2
(45) Date of Patent: Jan. 1, 2013

(54) COMPUTATION DEVICE INCORPORATING MOTION DETECTION AND METHOD THEREOF

(75) Inventors: Philip M. Seibert, Round Rock, TX (US); Ernesto Ramirez, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 831 days.

(21) Appl. No.: 12/133,588

(22) Filed: Jun. 5, 2008

(65) Prior Publication Data

US 2009/0303205 A1   Dec. 10, 2009

(51) Int. Cl.
*G06F 3/038* (2006.01)
*G09G 5/00* (2006.01)
*G11B 15/18* (2006.01)
*G11B 17/00* (2006.01)
*G11B 19/02* (2006.01)
*G05D 1/02* (2006.01)
*G05D 1/00* (2006.01)

(52) U.S. Cl. ........... 345/204; 345/158; 360/69; 700/302

(58) Field of Classification Search ............ 345/204, 345/156
See application file for complete search history.

(56) References Cited

U.S. PATENT DOCUMENTS

| | | | |
|---|---|---|---|
| 5,245,909 A * | 9/1993 | Corrigan et al. | 89/41.19 |
| 6,304,431 B1 * | 10/2001 | Kim | 361/679.09 |
| 6,340,957 B1 * | 1/2002 | Adler et al. | 345/1.3 |
| 6,845,277 B1 * | 1/2005 | Michelet et al. | 700/83 |
| 6,882,335 B2 * | 4/2005 | Saarinen | 345/156 |
| 7,030,868 B2 * | 4/2006 | Clapper | 345/158 |
| 7,154,692 B2 | 12/2006 | Ogawa et al. | |
| 7,161,758 B2 * | 1/2007 | Adapathya et al. | 360/69 |
| 2005/0114641 A1 | 5/2005 | O'Connor et al. | |
| 2005/0250562 A1 * | 11/2005 | Carroll | 455/575.3 |
| 2006/0017692 A1 * | 1/2006 | Wehrenberg et al. | 345/156 |
| 2008/0261660 A1 * | 10/2008 | Huh et al. | 455/566 |
| 2008/0311958 A1 * | 12/2008 | Oswald et al. | 345/1.1 |

OTHER PUBLICATIONS

Clifford, M. et al. "Measuring Tilt with Low-g Accelerometers" Freescale Semiconductor Application Note, Freescale Semiconductor, Inc., 2005, pp. 1-5.

* cited by examiner

*Primary Examiner* — Bipin Shalwala
*Assistant Examiner* — Ryan A Lubit
(74) *Attorney, Agent, or Firm* — Larson Newman, LLP

(57) ABSTRACT

Information from an accelerometer integrated at a computation device is received. An orientation of a display of the computation device, or other attribute, can be determined based upon the received information based upon an assumed reference, such as a desktop surface that is perpendicular to a gravitational vector, or based upon information from another accelerometer, such as an accelerometer within a base portion of a laptop computer. An operation is performed based upon the information.

20 Claims, 4 Drawing Sheets

COMPUTATION DEVICE INCORPORATING MOTION DETECTION AND METHOD THEREOF

BACKGROUND

1. Field of the Disclosure

This disclosure relates generally to computation devices, and more particularly to computation devices that include an acceleration detecting device.

2. Description of the Related Art

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

One type of information handling system is a laptop computer, which when closed turns off its display. However, current laptop systems are limited by the use of mechanical or magnetic switches that must be placed at specific locations of the laptop and only provide information that to determine whether the laptop is open or closed. As a result, features requiring additional resolution cannot be accommodated by these devices, their mechanical nature limits their placement which reduces design freedom, and they are susceptible to outside interference, either mechanical or magnetic. Therefore, a device and method of overcoming these problems would be useful.

BRIEF DESCRIPTION OF THE DRAWINGS

Embodiments incorporating teachings of the present disclosure are illustrated and described with respect to the drawings presented herein.

DETAILED DESCRIPTION

Information from an accelerometer integrated at a computation device is received. An orientation of a display of the computation device, or other attribute of the computation device, can be determined based upon the information from the accelerometer. For example, an orientation of a display of a computation device can be determined based upon information from an accelerometer having a fixed position relative to the display. The orientation can be based upon the assumption that the computation device is sitting on a desktop surface that is perpendicular to a gravitational vector. Alternatively, the orientation of the display of a laptop computer can be further determined relative a base portion of the laptop computer based upon information received from another accelerometer that is integrated at a fixed position relative the base portion. An operation is performed based upon the orientation, or other attribute, that is determined based upon the accelerometer information. For example, a laptop computer can enter a low-power mode of operation in response to an orientation of its display indicating that it is closed.

Figure 1:
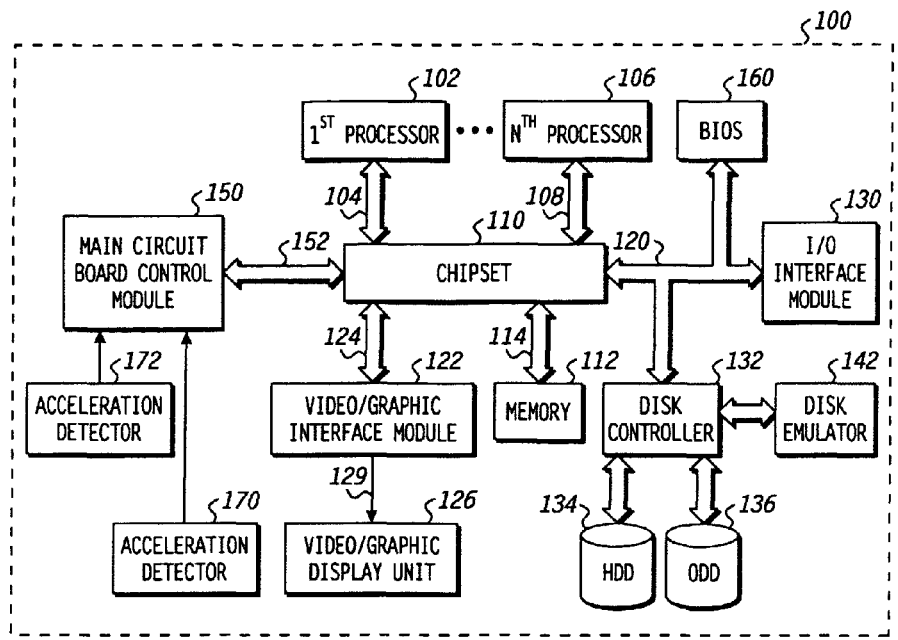
FIG. 1 includes a block diagram of an information handling system including an accelerometer in accordance with the present disclosure.

FIG. 1 illustrates a block diagram of an exemplary embodiment of an information handling system 100. The information handling system 100 can be a computer system such as a server, a desktop computer, a laptop computer, a rack of computers (e.g., networked servers), the like, or any combination thereof. After reading this specification, skilled artisans will appreciate that the information handling system can be configured to their particular needs or desires.

As illustrated in FIG. 1, the information handling system 100 can include a processor 102 connected to a host bus 104 and can further include additional processors generally designated as $N^{th}$ processor 106 connected to a host bus 108. Processor 102 and 106 can be separate physical processors. The processor 102 can be connected to a chipset 110 via the host bus 104. Further, the processor 106 can be connected to the chipset 110 via the host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between processor 102 and processor 106. For example, the chipset 110 including an AHA enabled-chipset can include a memory controller hub and an input/output (I/O) controller hub. As a memory controller hub, the chipset 110 can function to provide access to processor 102 using host bus 104 and processor 106 using the host bus 108. The chipset 110 can also provide a memory interface for accessing memory 112 using a host bus 114. In a particular embodiment, the host buses 104, 108, and 114 can be individual buses or part of the same bus. The chipset 110 can also provide bus control and can handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video/graphics interface module 122 that can be connected to the chipset 110 using host bus 124. The video/graphics module 122 provides image information to a video/graphics display device 126 via interconnect 129. The display unit 126 can include one or more types of video/graphics display devices such as a flat panel display (FPD) or other type of display device.

The information handling system 100 can also include an I/O interface module 130 that can be connected via an I/O bus 120 to the chipset 110. The I/O bus 120 and the I/O interface 130 can include industry standard buses or proprietary buses and respective interfaces or controllers. For example, the I/O bus 120 can include a Peripheral Component Interconnect (PCI) bus or a high speed PCI-Express bus. In one embodiment, a PCI parallel bus can be operated at approximately 66 MHz and a PCI-Express serial bus can be operated at approximately 2.5 GHz. PCI buses and PCI-Express buses can be provided to comply with industry standards for connecting and communicating between various PCI-enabled hardware devices. Other buses can also be provided in association with, or independent of, the I/O host bus 120 including other industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not separately illustrated). For example, a Northbridge portion of the chipset 110 can communicate with the processor 102 and can control interaction with the memory 112, interaction with bus 120, which can be a PCI bus, and interactions with bus 124 which can be a PCI bus or an AGP bus. The Northbridge portion can also communicate with the processor 102 using host bus 104 and with the processor 106 using the host bus 108. The chipset 110 can also include a Southbridge portion that can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 connected to the bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can further include main circuit board control module 150 that can be connected to the chipset 110 via a system communication bus 152, such as a control bus. Circuit board control module 150 also has two inputs for receiving motion information from acceleration detectors 170 and 172. Note that the acceleration detectors as further discussed herein are considered to be accelerometers, though any device capable of providing acceleration information for the purpose described herein can be used. The main circuit board control module 150 may reside on a main circuit board, such as a baseboard, a motherboard, or the like. Although not illustrated, other components, such as the processors 102 through 106, the display unit 126, the video/graphics interface module 122, the memory 112, and the disk controller 132 can be connected to the main circuit board control module 150. Commands, communications, or other signals may be sent to or received from the main circuit board control module 150 by any one or combination of components previously described.

The information handling system 100 can also include basic input/output system (BIOS) module 160 that can be connected to the I/O bus 120. The BIOS module 160 is operable to detect and identify components within the information handling system 100 and to provide the appropriate drivers for those components. The BIOS module 160 can be operable during a boot sequence and provide information needed to properly boot the information handling system 100 before, during, and after an operating system for the information handling system 100 is launched.

The information handling system disclosed herein implements a method in conjunction with accelerometers to configure a variety of system attributes based upon acceleration information provided by one or more accelerometers. It should be appreciated that wherein two accelerometers are illustrated in FIG. 1, one or more can be utilized depending on what operations are desired. Specific embodiments of devices and methods using one or more accelerometers in accordance with the present disclosure will be better understood with reference to FIGS. 2-5.

Figure 2:
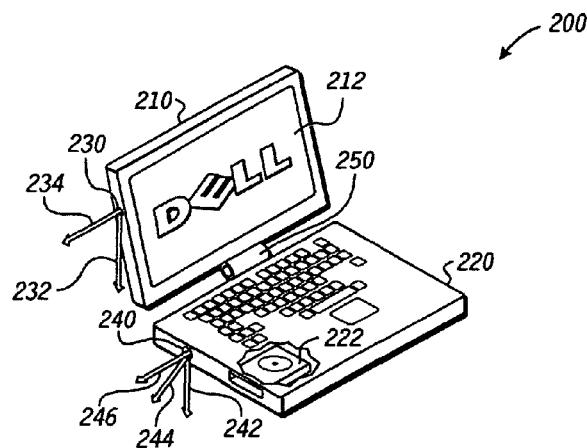
FIG. 2 includes a perspective view of a computation device incorporating two accelerometers.

FIG. 2 is a perspective view illustrating a computation device 200 such as a notebook computer that includes a display portion 210 and a base portion 220. Display portion 210 includes a display 212 and accelerometer 230. Base portion 220 includes hard drive 222 and accelerometer 240. Connector 250 allows the angle of display portion 210 to be varied relative to base portion 220.

As discussed herein, accelerometers 230 and 240 can provide orientation information related to the device to which it is attached. For example, accelerometer 230 has a fixed relationship with display portion 210 that is represented by the vector 234 of FIG. 2, and provides information relating to a planetary gravitational acceleration vector 232 relative to fixed vector 234. Similarly, accelerometer 240 has a fixed relationship with base portion 220 that is represented by the vector 234 of FIG. 2, and provides information relating to a planetary gravitational acceleration vector 242 relative to fixed vector 234. Accelerometer 240 is further illustrated to be a three-axis device that can provide information allowing the angle between a second fixed vector 244 and gravitational vector 242 as well as the angle between vector 246 and gravitational vector 242 to be calculated, thus allowing the left-right as well as front-back inclinations of base 220 to be determined. Though not specifically illustrated, in other embodiments, accelerometer 230 can be a three-axis device while accelerometer 240 is a two axis device, or both accelerometer 230 and 240 can be three-axis devices.

Accelerometer 230 can be located anywhere at display portion 210, such as included as part of the inverter, a preexisting printed circuit board (PCB) assembly, or other component. Accelerometer 230 can communicate with base portion 220 via the system management bus (SMBUS). Likewise, accelerometer 240 can be located anywhere at base portion 220 such as part of another preexisting PCB assembly. In an alternate embodiment, the connector 250 can be detachable, allowing the display portion 210 to be separated from the base portion 220. When detached, information can be communicated between the two portions wirelessly to determine an orientation of the display portion 210 relative the base portion 220.

Figure 3:
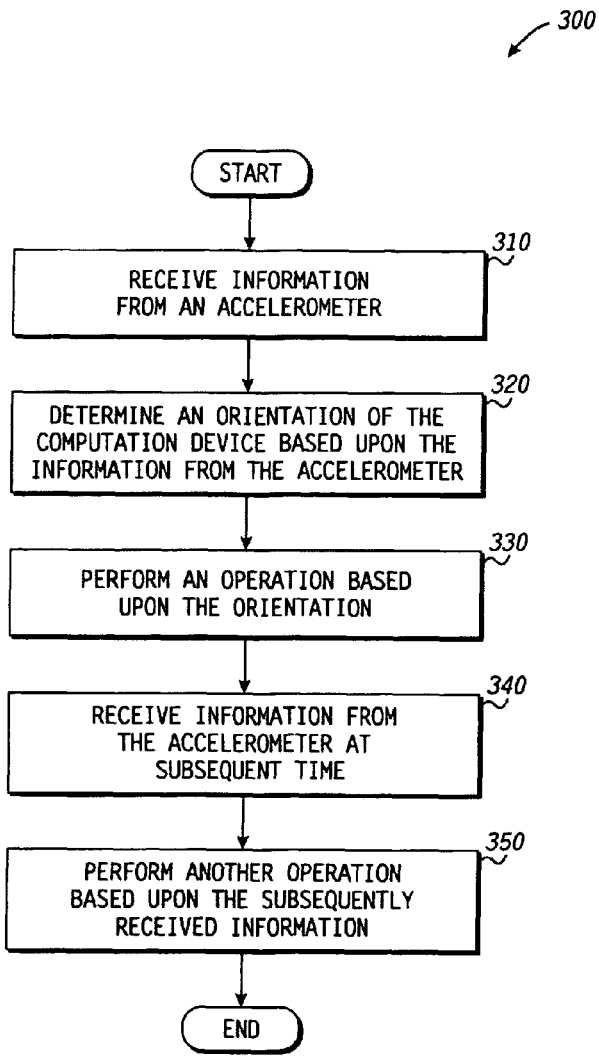
FIG. 3 includes a flow diagram illustrating how information provided by an accelerometer can be used to alter device attributes.

FIG. 3 is a flow diagram that illustrates a method in accordance with a specific embodiment of the present disclosure through which computation device 200 can perform operations based upon motion information received from accelerometer 230. The flow starts at block 310 wherein information is received from accelerometer 230. For example, information at accelerometer 230 related to vector 232 relative to vector 234 can be received at a control portion of the computational device for further processing. In addition, information can be received at another accelerometer such as accelerometer 240.

At block 320 an orientation of the computation device is determined based upon the received information. For example, an orientation of the display portion 210 relative the base 220 can be determined by comparing the vector information from the display portion 210 to a presumed or known orientation of the base portion. For example, the orientation of the display portion 210 can be based upon an assumption that the base portion 220 is perpendicular to the gravitational vector 232. In this embodiment, the accelerometer 240 is not needed. Alternatively, the orientation of the display portion 210 can be based upon a comparison of the information received from another accelerometer at block 310 to other vector information received from the same or different accelerometer.

The flow proceeds to step 330 wherein an operation is performed based upon the orientation. One example of an operation that can be performed is to detect closure of the display device 210, whereby the display device can be further placed into a low power mode. This method of detecting closure allows the elimination of traditional and costly magnetic or mechanical switch components that would otherwise be required to implement this feature. Such mechanical and magnetic switch designs can also suffer from external interference, such as a magnet inadvertently triggering a Hall effect integrated circuit.

Because the accelerometer can provide information that can be used to indicate the degree of inclination, the display can be configured to enter a power saving mode at any arbitrary and customizable suspend/resume angle or degree of closure. Another operation would be to vary a display image characteristic, such as the brightness, contrast, or orientation of an image displayed, based upon the degree of inclination. This would be useful with Liquid crystal display (LCD) technology commonly found in computation devices because such displays exhibit a limited range of viewing angle based on the inherent technology. Adjusting the image contrast or other characteristic in proportion to the angle or other orientation of the display can automatically minimize these limitations. Also, the display image can be flipped 180 degrees or rotated when the display portion 210 has been adjusted to a specific angle or inverted, such as one would do if one wanted to show someone sitting across from you what is on your screen. Modern computation devices support a wide range of display flexibility including swiveling and even detachment from their associated base portion 220, so there is a need for increased versatility and control of display operations. Moreover, these operations can be controlled by software procedures whereby the operations can be configured, updated, or otherwise adjusted by the user, or by device firmware or other software updates provided by the manufacturer.

The flow proceeds to step 340, where at a subsequent time further information is received from an accelerometer. The information can be received from the same accelerometer or a different accelerometer. The flow proceeds to block 350 wherein another operation is performed based upon the new information. The operation can be the same operation as performed at block 330, or a different operation.

Figure 4:
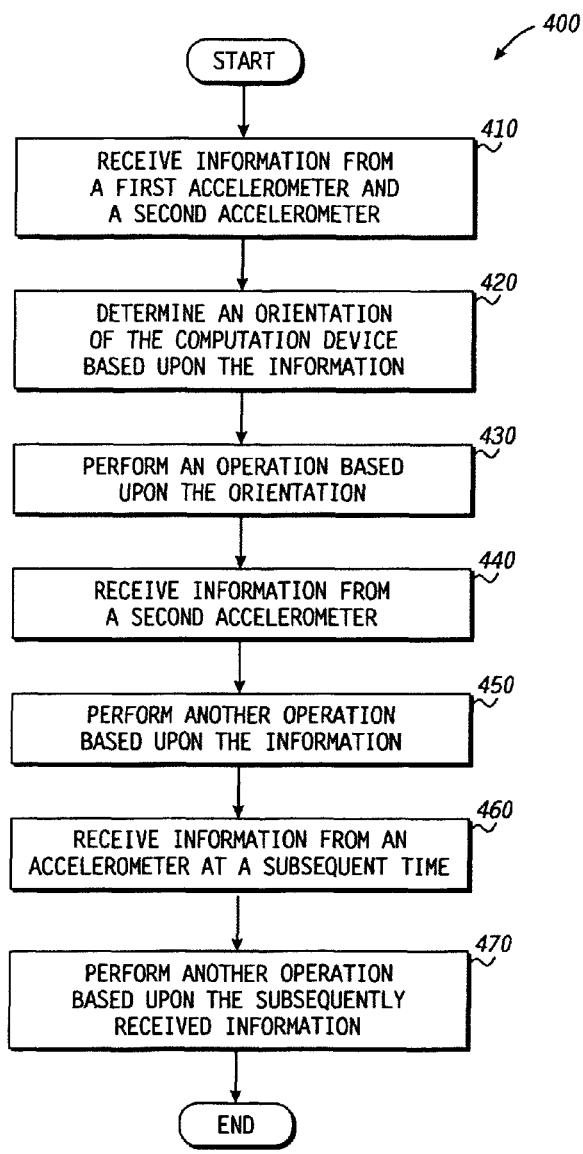
FIG. 4 includes a flow diagram illustrating how information provided by two accelerometers can be used to alter device attributes.

FIG. 4 is a flow diagram that further illustrates a method in accordance with a specific embodiment of the present disclosure. The flow starts at block 410 wherein information is received from a first accelerometer and a second accelerometer. The flow proceeds to block 420 wherein the orientation of the computation device is determined based upon the information from the first and second accelerometers. The flow proceeds to block 430 wherein an operation is performed based on the orientation. Such an operation can be as described above.

At block 440 additional information from the second accelerometer is received. The flow proceeds to block 450 wherein another operation is performed based on the motion information. For example, the information received at block 450 can be used to recalculate an orientation as previously described, or used in an alternate manner. For example, the information from a single accelerometer, e.g., either the first or the second accelerometer can be used to detect a free-fall situation indicating that computation device 200 has been dropped. In response to this information, an operation wherein the head of hard drive 222 is parked or the hard drive is otherwise stopped, thereby protecting the hard drive media and its head from damage.

The flow proceeds to block 460 wherein further information is received at a subsequent time. The flow ends at block 470 wherein yet another operation is performed based upon the motion information.

Figure 5:
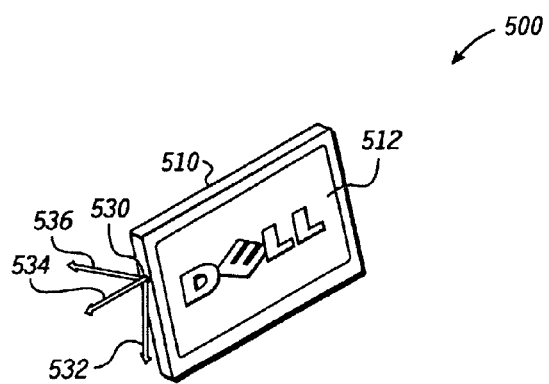
FIG. 5 includes a computation device that is a tablet PC.

FIG. 5 illustrates a computation device 500 that is a tablet PC. The tablet PC includes a display portion 212, and is illustrated without a base portion, such as a key board. It will be appreciated that in various embodiments a keyboard can be flexibly attached or in wireless communication with the tablet PC 500.

As discussed herein, accelerometer 530 can be either a three-axis or two-axis accelerometer that provides information related to the tablet PC to which it is attached. For example, accelerometer 530 has a fixed relationship with display portion 510 that is represented by the vector 534 of FIG. 2, and provides information relating to a planetary gravitational acceleration vector 532. Accelerometer 530 also has a fixed relationship with display portion 510 represented by vector 546, when accelerometer 530 is a 30 axis accelerometer. Based upon information from the accelerometer 530, can an attribute of the tablet PC can be determined, such as an orientation of the display device 512 relative the gravitational acceleration vector 532, or whether it has been dropped. Based upon this information, an operation can be performed at the tablet PC. For example, the information can indicate that the tablet PC has been set face-down on a relatively flat surface, causing the tablet PC to perform an operation to place itself in a low-power mode of operation. Specific operations implemented based upon information from an accelerometer can be defined or enabled by software resident at the computational device.

While a computation device with a single accelerometer is anticipated, with two accelerometers, not only can the orientation of display portion 210 be determined, but the orientation of display portion 210 relative to base portion 220 can also be ascertained. Display image characteristics that depend on the angle between display portion 210 and base portion 220 can now be adjusted. Motion information from both accelerometers can be simultaneously received and subsequent operations can be performed in parallel. One or both of the accelerometers can provide three-axis motion information further expanding the available functions that can be supported.

The incorporation of one or more accelerometers at computation device 200 can support new and previously impossible functionality and modes of operation while decreasing manufacturing costs. It should be appreciated that while a notebook computer is used to illustrate computation device 200, other computation devices can benefit from the devices and associated methods disclosed herein.

Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving first information from a first acceleration detector incorporated at a first portion of a computational device, the first portion comprising a base of the computation device;
   determining a first orientation of the first portion in response to receiving the first information;
   receiving second information from a second acceleration detector incorporated at a second portion of a computation device, the second portion comprising a display to provide video/graphic images, and being coupled to the first portion of the computation device;
   determining a second orientation of the second portion relative to the first orientation of the first portion in response to receiving the second information, wherein the relative orientations are determined based on a comparison of the first information and the second information; and
   performing a first operation at the computational device in response to determining the second orientation.

2. The method of claim 1, wherein the first portion is coupled to the second portion by a flexible attachment mechanism that allows the orientation of the first portion to the second portion to be varied.

3. The method of claim 2, wherein the flexible attachment mechanism allows detaching of the first portion from the second portion, and wherein the first portion can communicate with the second portion via an electronic wireless interface.

4. The method of claim 2, wherein the first portion can communicate with the second portion via a system management bus.

5. The method of claim 1, wherein at least one of the first and the second acceleration detectors is a three-axis accelerometer.

6. The method of claim 1, further comprising:
   receiving third information from the first acceleration detector;
   determining an attribute of the computation device based upon the third information, the attribute being other than a third orientation; and
   performing a second operation at the computational device in response to determining the attribute.

7. The method of claim 6, wherein the second operation includes protecting a hard drive.

8. The method of claim 1, wherein performing the first operation includes adjusting a display image characteristic.

9. The method of claim 8, wherein adjusting the display image characteristic includes adjusting a brightness of the display.

10. The method of claim 8, wherein adjusting the display image characteristic includes adjusting an image orientation of the display.

11. The method of claim 1, further comprising:
    receiving third information from the second acceleration detector;
    determining a third orientation of the second portion relative to the orientation of the first portion in response to receiving the third information; and
    performing a second operation at the computational device in response to determining the third orientation.

12. The method of claim 1, wherein:
    the third orientation is such that the first portion and the second portions are closed; and
    performing the second operation includes placing the display in a low power mode.

13. A computation device comprising:
    a first portion including a base;
    a first acceleration detector incorporated at the first portion to provide a first information for determining an orientation of the first portion;
    a second portion including a display to provide video/graphic images, wherein the second portion is flexibly attached to the first portion;
    a second acceleration detector incorporated at the second portion to provide a second information for determining an orientation of the second portion; and
    a processor operable to:
       receive the first information;
       determine a first orientation of the first portion based on the first information;
       receive the second information;
       determine a second orientation of the second portion relative to the orientation of the first portion based on a comparison of the first information and the second information; and
       perform a first operation at the computational device in response to determining the second orientation;
    wherein at least one of the first and second acceleration detectors is a three-axis accelerometer.

14. The computation device of claim 13, wherein the first operation includes adjusting a display image characteristic.

15. The computational device of claim 13, wherein the processor is further operable to:
    receive third information from the first acceleration detector;
    determine an attribute of the computation device based upon the third information, the attribute being other than a third orientation; and
    perform a second operation at the computational device in response to determining the attribute.

16. The computational device of claim 15, wherein the second operation includes protecting a hard drive.

17. The computational device of claim 13, wherein the processor is further operable to:
    receive third information from the second acceleration detector;
    determine a third orientation of the second portion relative to the orientation of the first portion in response to receiving the third; and
    perform a second operation at the computational device in response to determining the third orientation.

18. The computational device of claim 17, wherein the second operation includes placing the computational device in a low power mode.

19. The computational device of claim 13, further comprising:
    a flexible attachment mechanism that couples the first portion to the second portion, wherein the flexible attachment mechanism allows detaching of the first portion from the second portion, and wherein the first portion can communicate with the second portion via an electronic wireless interface.

20. A method comprising:
    receiving first information from a first acceleration detector incorporated at a base of a computation device;

receiving second information from a second acceleration detector incorporated at a display of the computation device;

determining an orientation of the display of the computation device based upon the first information and the second information; and performing a first operation at the computational device based upon the orientation;

wherein at least one of the first and second acceleration detectors is a three-axis accelerometer.

* * * * *